US012612990B2

(12) United States Patent
King, Jr.

(10) Patent No.: US 12,612,990 B2
(45) Date of Patent: Apr. 28, 2026

(54) SIDE WALL SEAL FOR PIPING

(71) Applicant: Roof Goose Vent LLC, North Kingstown, RI (US)

(72) Inventor: Jack F. King, Jr., North Kingstown, RI (US)

(73) Assignee: Roof Goose Vent LLC, North Kingstown, RI (US)

( * ) Notice: Subject to any disclaimer, the term of this patent is extended or adjusted under 35 U.S.C. 154(b) by 0 days.

(21) Appl. No.: 17/954,952

(22) Filed: Sep. 28, 2022

(65) Prior Publication Data

US 2023/0098027 A1 Mar. 30, 2023

Related U.S. Application Data

(60) Provisional application No. 63/250,628, filed on Sep. 30, 2021.

(51) Int. Cl.
F16L 41/12 (2006.01)
F16L 47/10 (2006.01)

(52) U.S. Cl.
CPC ............... F16L 41/12 (2013.01); F16L 47/10 (2013.01)

(58) Field of Classification Search
CPC . F16L 41/12; F16L 47/10; F16L 5/027; F16L 5/14; F16L 41/004; F16L 5/10
See application file for complete search history.

(56) References Cited

U.S. PATENT DOCUMENTS

| 4,330,142 | A | | 5/1982 | Paini | |
| 5,103,609 | A | * | 4/1992 | Thoreson | A62C 2/065 |
| | | | | | 52/232 |

| 5,273,077 | A | * | 12/1993 | Oropallo | F16L 55/115 |
| | | | | | 138/92 |
| 5,857,800 | A | | 1/1999 | Nell | |
| 6,394,464 | B1 | * | 5/2002 | Moreau | H02G 3/088 |
| | | | | | 403/312 |
| 6,612,620 | B1 | | 9/2003 | Nordstrom et al. | |
| 7,549,258 | B2 | | 6/2009 | Lajewski | |
| 7,735,667 | B2 | | 6/2010 | Schutz | |
| 8,714,601 | B2 | | 5/2014 | Kawamata | |
| 9,255,412 | B2 | * | 2/2016 | Haynes | E04D 13/1407 |

(Continued)

FOREIGN PATENT DOCUMENTS

| CN | 211059547 U | 7/2020 | |
| EP | 2169289 A1 * | 3/2010 | ............. F16L 5/027 |

(Continued)

OTHER PUBLICATIONS

CSI Designs, Pipetite Reboot, Sep. 20, 2021.

(Continued)

*Primary Examiner* — James M Hewitt, II
(74) *Attorney, Agent, or Firm* — Breiner & Breiner, L.L.C.

(57) ABSTRACT

A side wall seal for piping comprising an annular ring adapted to be attached to a building sidewall, an annular wall extending outwardly from said annular ring and having a seam in said annular wall, a first ear extending outwardly from the annular wall adjacent a first side of the seam and a second ear extending outwardly from the annular wall adjacent a second side of the seam, and a closure mechanism for closing the seam around said piping. A wedge member may be used with the side wall seal to angle the piping downward.

15 Claims, 8 Drawing Sheets

(56)                    References Cited

U.S. PATENT DOCUMENTS

| | | | |
|---|---|---|---|
| 9,581,271 B2 | 2/2017 | Haynes et al. | |
| 9,651,174 B2 | 5/2017 | Lechuga et al. | |
| 12,012,733 B2 * | 6/2024 | Vaseleniuck | ........... F16L 41/12 |
| 2009/0302545 A1 | 12/2009 | Haynes | |
| 2010/0147243 A1 | 6/2010 | Stec et al. | |
| 2013/0213546 A1 * | 8/2013 | Cichon, Jr. | .............. H02G 3/22 |
| | | | 156/60 |
| 2021/0140565 A1 | 5/2021 | Chance et al. | |

FOREIGN PATENT DOCUMENTS

| | | | |
|---|---|---|---|
| EP | 4046876 A1 | 8/2022 |
| FR | 2826091 A1 | 12/2002 |
| FR | 3067335 A1 | 12/2018 |
| KR | 102184450 B1 | 11/2020 |

OTHER PUBLICATIONS

Flashings Direct, Find The Right Master Flash® Pipe Boot and Vent Flashing Solutions For Your Next Project, Sep. 20, 2021.
Westatlantic, Wall penetration pipe seals—watertight, Sep. 20, 2021.
Drainagecentral, 110mm PVCu Push Fit Soil Pipe Fire Collar BFS4, Sep. 20, 2021.
TSS575 Airex Titan GS30 3/4" Gray Lineset Wall Seal System.

* cited by examiner

FIG. 1A
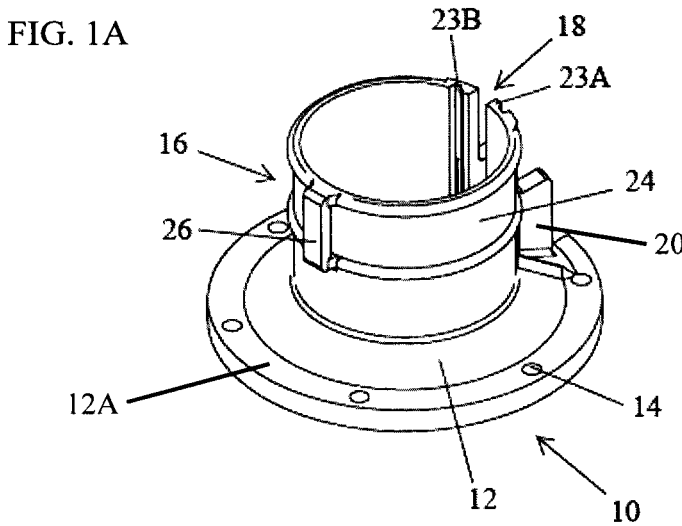
FIG. 1B
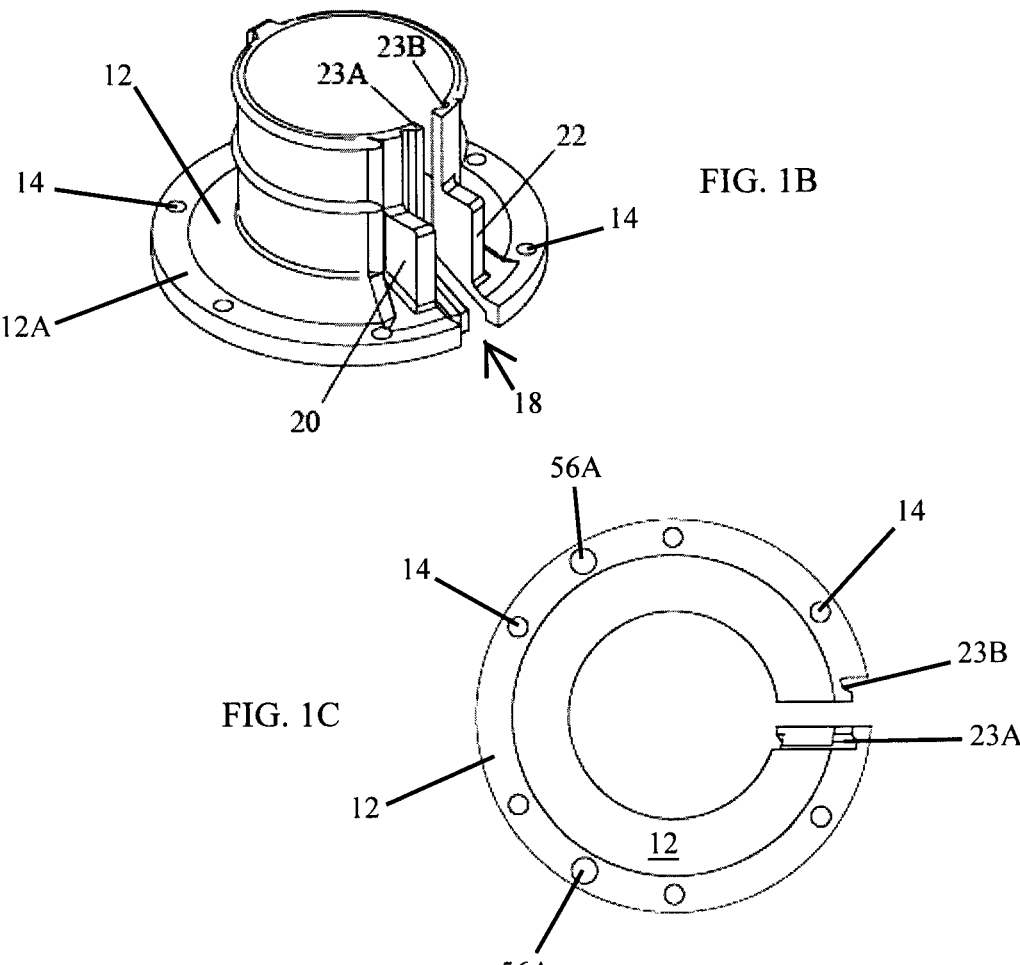
FIG. 1C

FIG. 2A
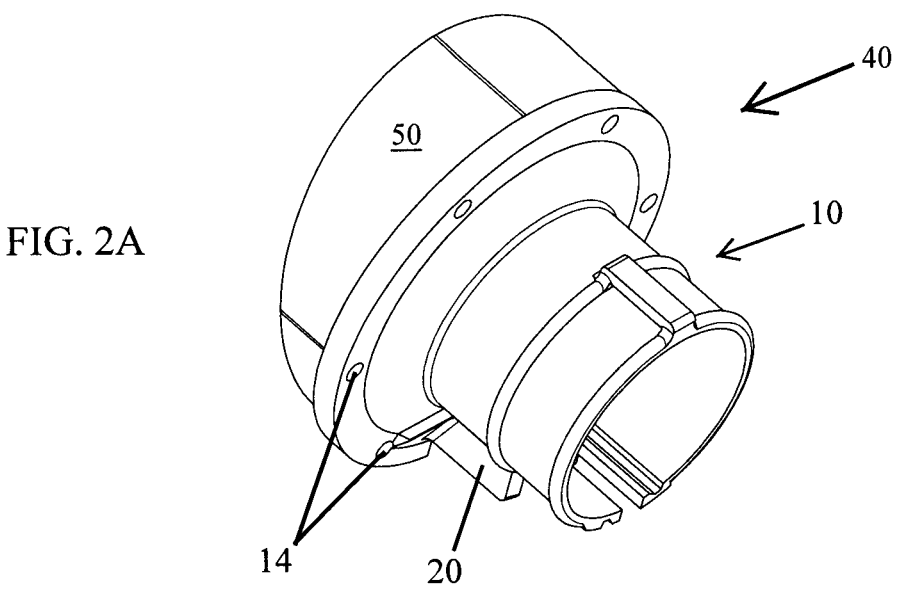
FIG. 2C
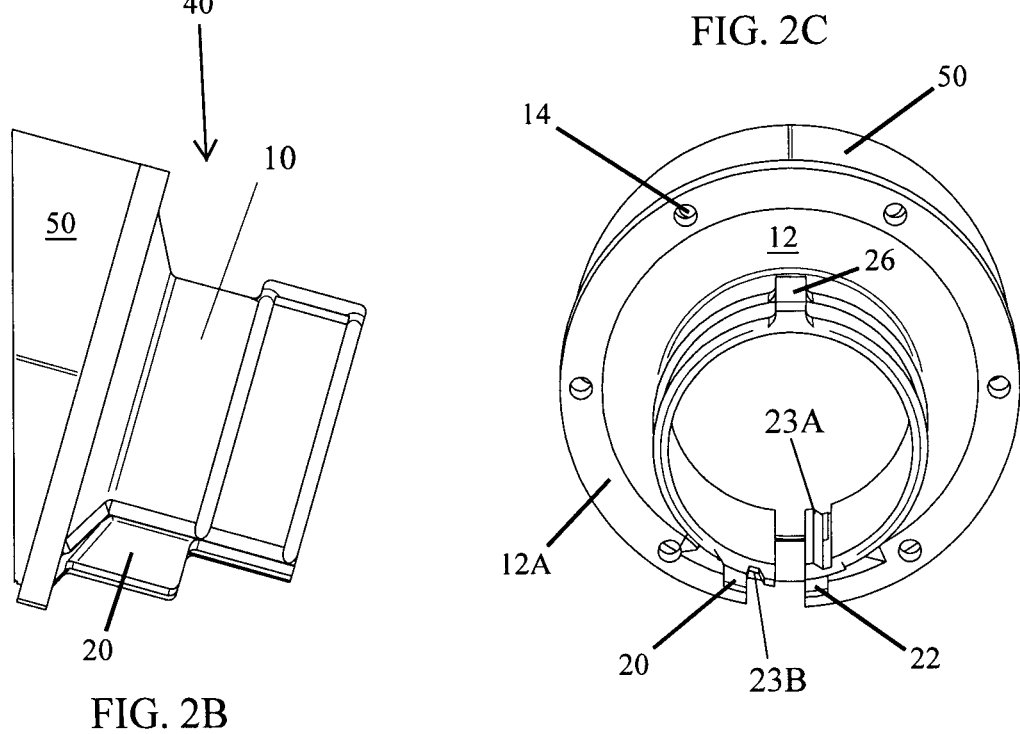
FIG. 2B

FIG. 4A
58
50
68
68
14A
14A
52
54
66
64
60
62
FIG. 4B
14A
64
14A
66
62
FIG. 4C
58
14A
68A
68A
14A
54
56
60    62
FIG. 4D
58
52
54
56
68
60
FIG. 4E
62
68    A    68
14A
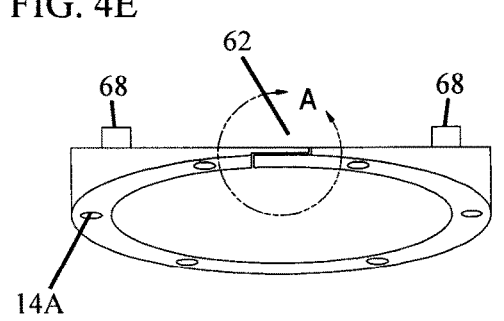
64    62
66
FIG. 4F
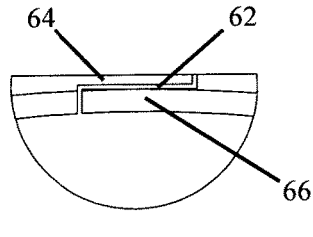

SIDE WALL SEAL FOR PIPING

RELATED APPLICATION

This application claims the benefit of U.S. Provisional Application Ser. No. 63/250,628, filed Sep. 30, 2021, entitled "Side Wall Seal For Piping," which is incorporated herein by reference in its entirety.

FIELD OF THE INVENTION

The present invention relates to a side wall seal for piping. More specifically, the invention relates to a side wall seal for piping for pipes exiting a building at a right angle to the side wall.

BACKGROUND OF THE INVENTION

Pipes exit the side wall of buildings and require a water resistant seal. Such pipes may be for linesets, e.g. for an air conditioning system; for a gas line; for a drain line; or for similar pipes exiting the side wall of a building. The seal may be for a single pipe or for multiple pipes.

Seals for piping are known in the prior art such as the TSS575 Airex Titan GS30¾" Gray Lineset Wall Seal System comprising a rectangular box covering an opening in a building side wall through which a pipe extends and having a rubber gasket fitted over the pipe and against the box to provide a seal. This seal includes a number of parts, cannot be used in retrofit installation and cannot be used in tight quarters because of its size.

While the prior art seals may provide some benefits, improvement is possible, including providing a water resistant seal which is inexpensive and easy to use. The present invention addresses these issues.

SUMMARY OF THE INVENTION

A primary object of the invention is to provide a side wall seal for piping.

Another primary object of the invention is to provide a water resistant seal for piping exiting from a side wall of a building, including for a single pipe or for multiple pipes.

Another primary object of the invention is to provide a side wall seal for piping which is water resistant and useful for pipes exiting a building side wall at a right angle.

Another primary object of the invention is to provide a side wall seal for piping which is water resistant and which may be used for retrofit installation for existing pipes or for pipes in new construction.

Another primary object of the invention is to provide a side wall seal for piping which is water resistant, one-piece and is made of plastic and overmolded with a flexible rubber and is minimally sized to fit into tight places.

The invention is directed to a side wall seal for piping comprising an annular ring adapted to be attached to a building sidewall, a wall extending outwardly from said annular ring and having a seam in said wall, a first ear extending outwardly from said wall adjacent a first side of the seam and a second ear extending outwardly from the wall adjacent a second side of the seam, and a closure mechanism for closing the seam around said piping. The side wall seal may also be used with a wedge member to angle the side wall seal downward. The wedge member is also useful when the building sidewall is not completely vertical, e.g. where the sidewall has a thatched siding.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1A is a perspective view of the side wall seal for piping of the present invention.

FIG. 1B is another perspective view of the side wall seal of FIG. 1.

FIG. 1C is a bottom view of the side wall seal of FIG. 1.

FIG. 2A shows the side wall seal of FIG. 1 for angling the side wall seal downward by using a wedge member.

FIG. 2B is a side view of the assembly of FIG. 2A.

FIG. 2C is a front perspective view of the assembly of FIG. 2A.

FIG. 4A is a perspective front view of the wedge member of FIGS. 2 and 3.

FIG. 4B is a perspective back view of the wedge member of FIGS. 2 and 3.

FIG. 4C is a back view of the wedge member of FIGS. 2 and 3.

FIG. 4D is a side view of the wedge member of FIGS. 2 and 3.

FIG. 4E is a bottom view of the wedge member of FIGS. 2 and 3.

FIG. 4F is an enlarged view of section A of FIG. 4E.

DETAILED DESCRIPTION OF THE PREFERRED EMBODIMENTS

Figures 3A, 3B:
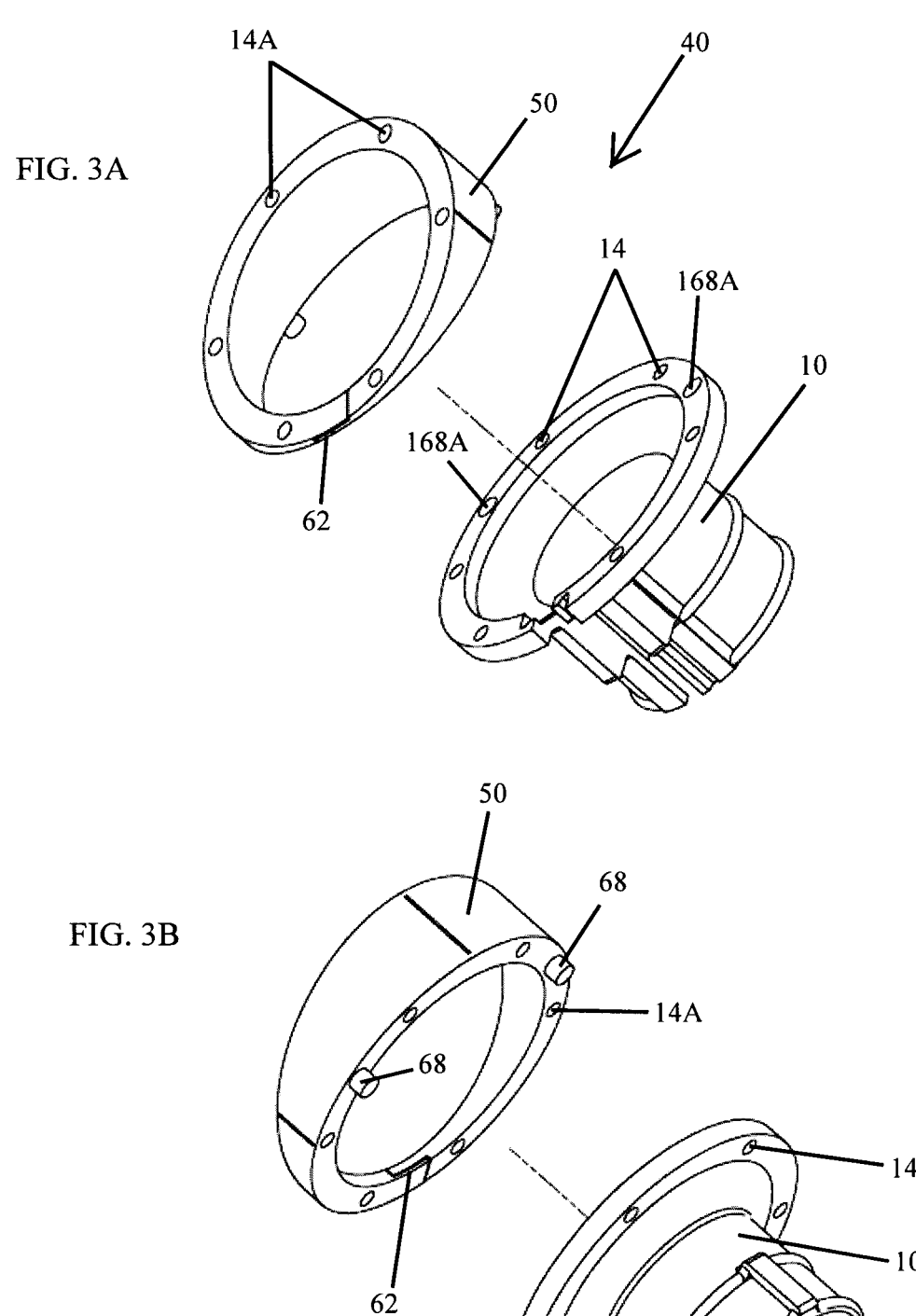
FIG. 3A is a perspective exploded view of the seal and the wedge member of FIG. 2.
FIG. 3B is another perspective exploded view of the seal and the wedge member of FIG. 2.
Figures 5A, 5B, 5C, 5D:
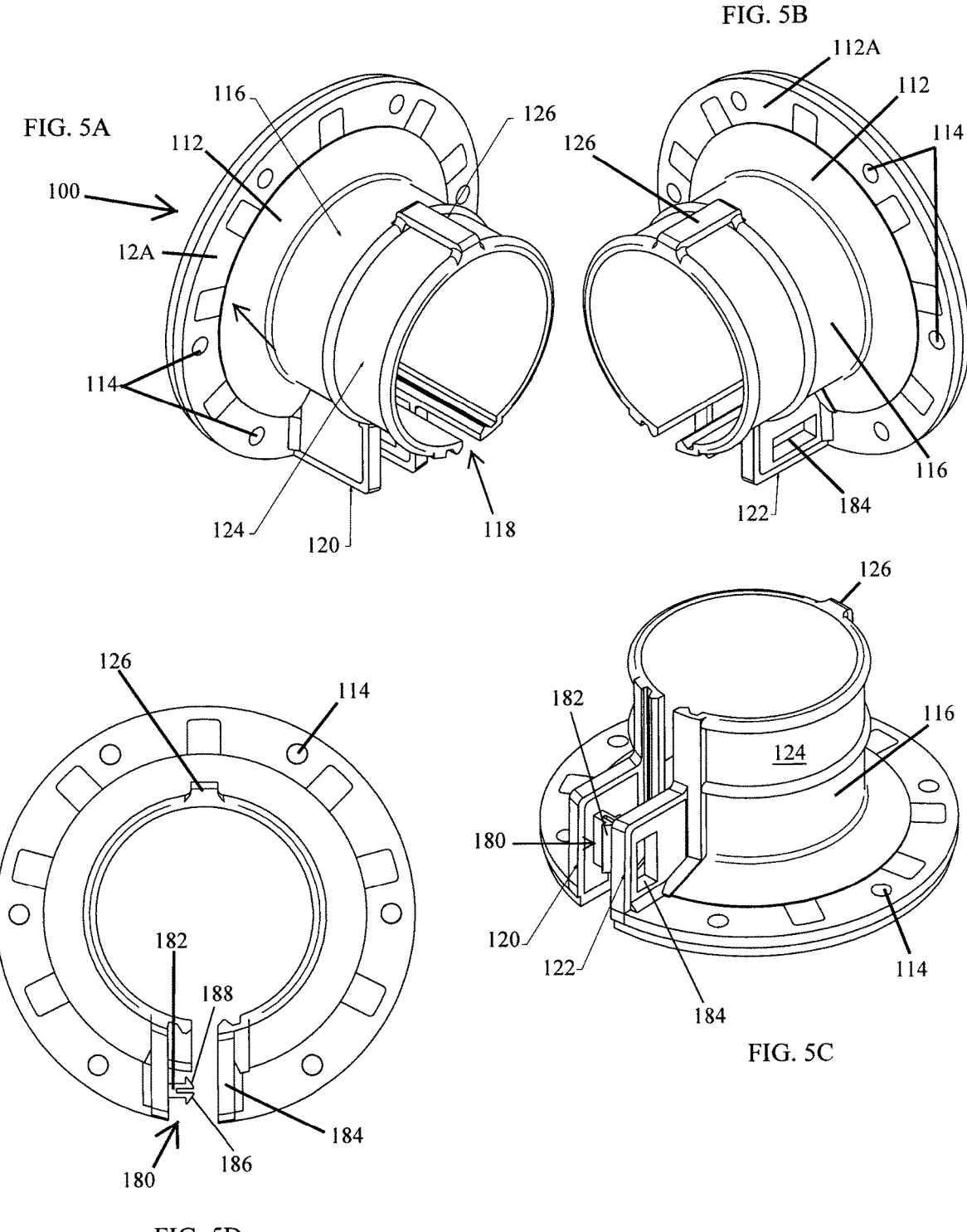
FIG. 5A is a perspective view of an alternate embodiment of the side wall seal of the invention.
FIG. 5B is is another perspective view of the side wall seal of FIG. 5A.
FIG. 5C is another perspective view of the side wall seal of FIG. 5A.
FIG. 5D is a top view of the side wall seal of FIG. 5A.
Figure 6A:
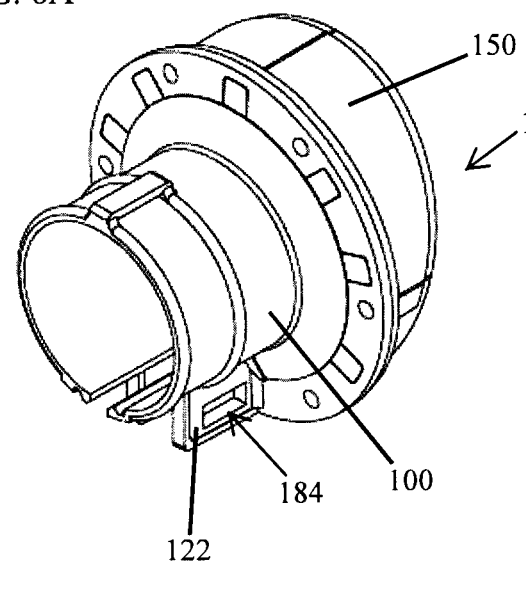
FIG. 6A is a perspective view of the side wall seal of FIG. 5 with a wedge member as shown in FIG. 8.
Figure 6B:
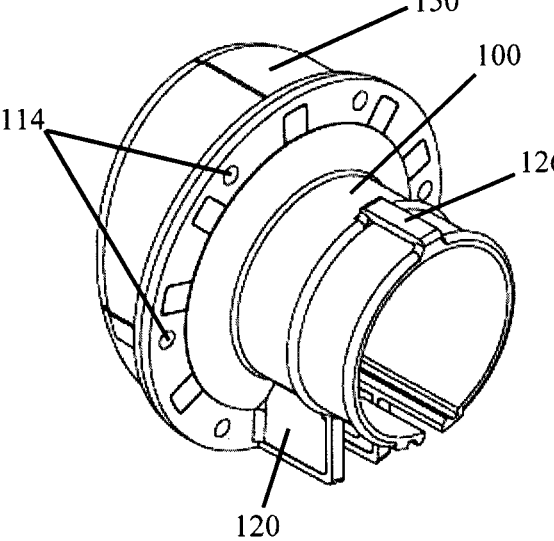
FIG. 6B is another perspective view of the side wall seal of FIG. 5 with a wedge member as shown in FIG. 8.
Figure 6C:
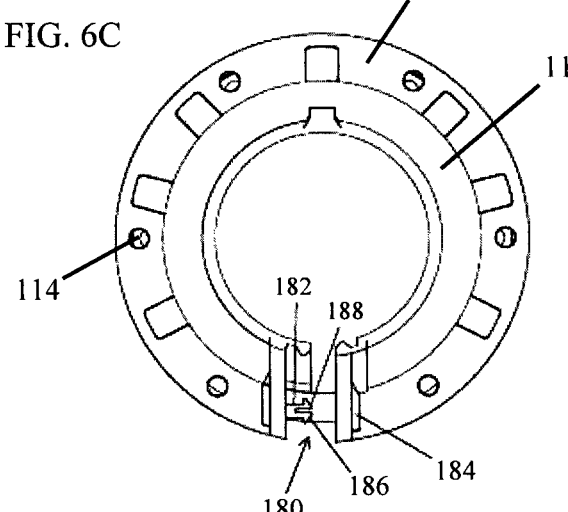
FIG. 6C is a front view of the side wall seal of FIG. 5 with a wedge member as shown in FIG. 8.
Figure 6D:
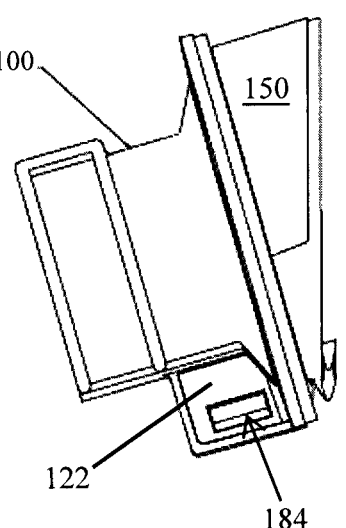
FIG. 6D is a side view of the side wall seal of FIG. 5 with a wedge member as shown in FIG. 8.

The invention is directed to a side wall seal for piping. Specifically, a water resistant seal is required for piping exiting from a side wall from a building, including for a single pipe or for multiple pipes. The device is useful for pipes exiting a building side wall at a right angle to the side wall. The device may be used for retrofit installation for existing piping or for piping in new construction installation. The seal is made of plastic such as, but not limited to, ASA (acrylic-styrene-acrylonitrile copolymer), and overmolded with a flexible rubber such as, but not limited to, a thermoplastic elastomer such as Santoprene®. The seal is minimally sized to fit into tight spaces.

A first embodiment of the side wall seal is shown in FIGS. 1A-1C. The seal 10 includes an annular ring 12 having a collar 12A having an opening through which a pipe extends. The seal 10 is attached to a side wall of a building by fasteners (not shown) extending through apertures 14. The seal 10 further includes an outwardly extending substantially annular wall 16 extending from ring 12 having an opening through which a pipe extends. Wall 16 includes a seam 18 and ears 20 and 22 extending outwardly from wall 16. Seal 10 is easily installed by retrofit over existing piping extending from a building side wall because seam 18 may be pulled apart and slipped over an existing pipe or a bundle of pipes. After the seam 18 is installed over the piping, the ears 20 and 22 are grasped and squeezed to close the seal and seam 18 by bringing the ears 20 and 22 together. The seam is closed by a tongue 23A and groove 23B closure mechanism. In some instances, a band or hose clamp (not shown) may be used to further hold the seal 10 in a closed and sealed relation. The band or hose clamp extends around wall portion 24 and is secured by a retaining member 26. In one preferred embodiment, the dimensions of the side wall seal are about 2.13 inches from the annular collar to the top of wall 16 with a diameter of the opening of about 2.35 inches when the seam 18 is open and 2.25 inches when the seam is closed. It is understood that these dimensions will vary depending on the piping.

Referring to FIGS. 2-4, there is shown a side wall seal assembly 40 for angling the seal 10 downward by using a wedge member 50 with seal 10. Wedge 50 is an accessory to the side wall seal 10. It is useful in angling the seal downwards for better water resistance. Wedge 50 is also useful when the building side wall is not completely vertical, e.g. where the building has a thatched siding, thereby allowing the side wall seal 10 to extend from the building side wall at a substantially 90 degree angle. The wedge member 50 may be attached to the building side wall and the seal 10 attached to the wedge 50. Wedge 50 includes a front wall 52, a side wall 54, a rear wall 56, a top portion 58 and a bottom portion 60. There is a split seam 62 in bottom portion 60 such that the wedge 50 may be pulled apart to fit around the pipe exiting the building side wall and then closed and held in place by seam closure members 64 and 66. The side wall seal 10 is first aligned with wedge 50 by lugs 68 of the wedge which are inserted into openings 68A of the seal 10. The seal 10 is then attached to wedge 50 by fasteners (not shown) extending through apertures 14 of side wall seal 10 and apertures 14A of wedge 50 then into the building side wall. In one preferred embodiment, the dimensions of the wedge member are about 1.12 inches from the back wall to the front wall at the top portion and about 0.15 inches at the bottom portion. It is understood that these dimensions will vary depending on the piping.

A second embodiment of side wall seal 100 is shown in FIGS. 5-8. The seal 100 is substantially similar to the first embodiment 10 and further includes an additional closure mechanism 180. The seal 100 includes an annular ring 112 having a collar 112A having an opening through which a pipe extends. The seal 100 is attached to a side wall of a building by fasteners (not shown) extending through apertures 114. The seal 100 further includes an outwardly extending substantially annular wall 116 extending from ring 112 having an opening through which a pipe extends. Wall 116 includes a seam 118 and ears 120 and 122. Seal 100 is easily installed by retrofit over existing piping extending from a building side wall because seam 118 may be pulled apart and slipped over an existing pipe or a bundle of pipes. After the seam 118 is installed over the piping, the ears 120 and 122 are grasped and squeezed to close the seal and seam 118 by bringing the ears 120 and 122 together. The seam is closed by closure 180 as discussed below. In some instances, a band or hose clamp (not shown) may be used to further hold the seal 100 in a closed and sealed relation. The band or hose clamp extends around wall portion 124 and is secured by a retaining member 126. Closure 180 comprises a snap connection having snap 182 and aperture 184 in ear 122 for receiving snap 182. Snap 182 includes arms 186,188 for engaging an outside wall of aperture 184 of ear 122.

Figures 7A, 7B, 7C:
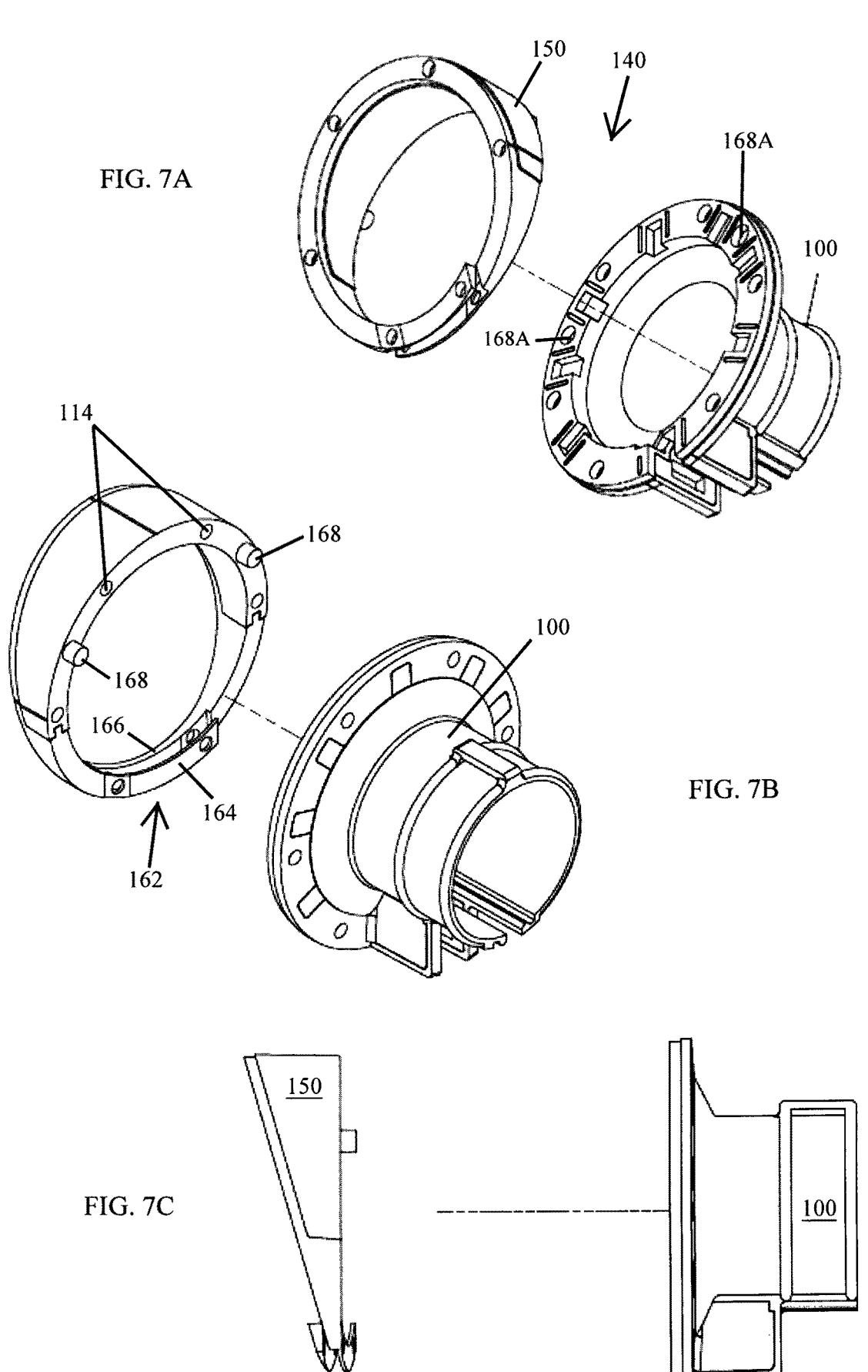
FIG. 7A is a perspective exploded view of the side wall seal of FIG. 5 and the wedge member of FIG. 8.
FIG. 7B is another perspective exploded view of the side wall seal of FIG. 5 and the wedge member of FIG. 8.
FIG. 7C is a side exploded view of the side wall seal of FIG. 5 and the wedge member of FIG. 8.
Figures 8A, 8B, 8C, 8D, 8E, 8F:
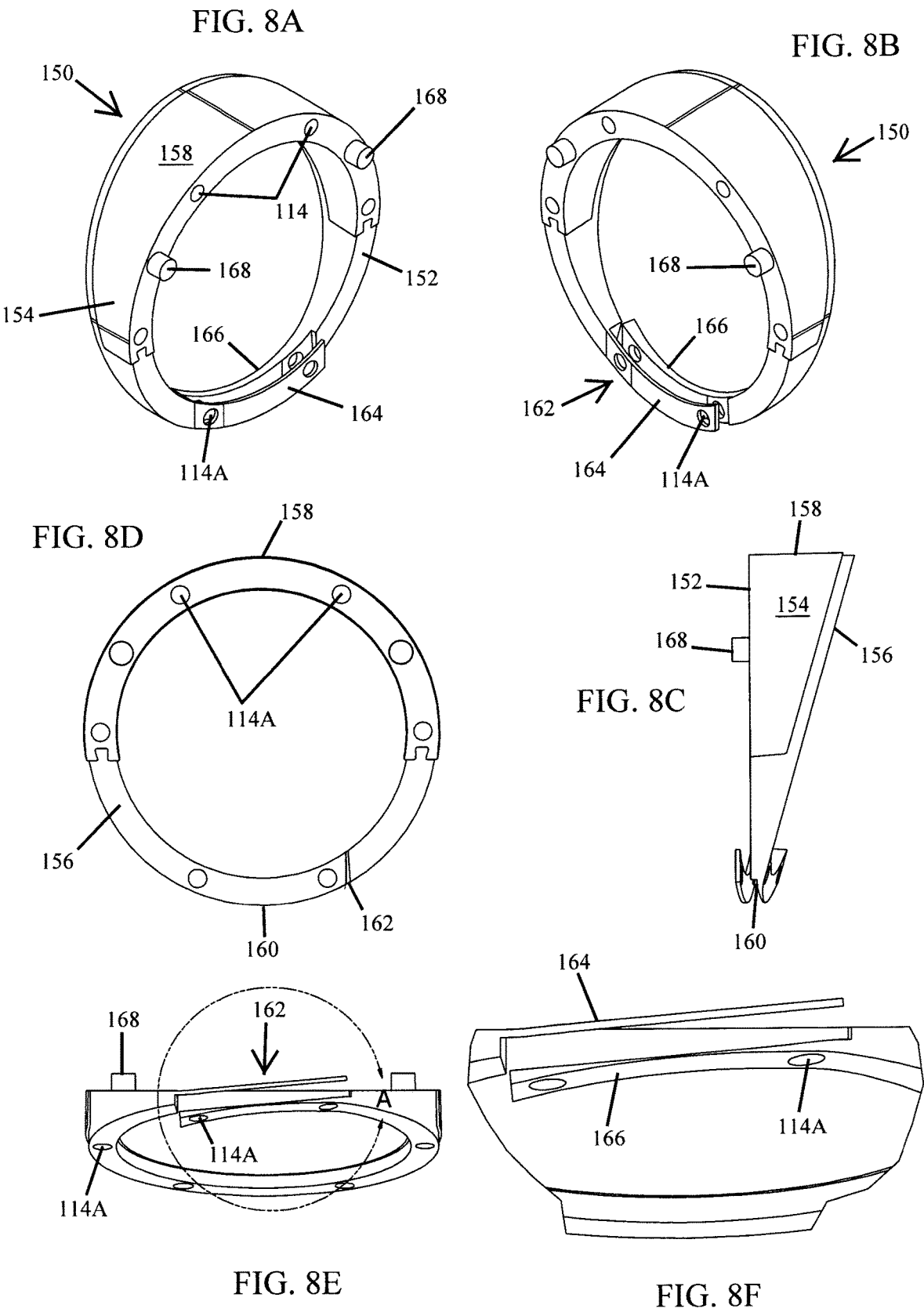
FIG. 8A is a front perspective view of the wedge member of FIGS. 6 and 7.
FIG. 8B is another front perspective view of the wedge member shown in FIGS. 6 and 7.
FIG. 8C is a side view of the wedge member shown in FIGS. 6 and 7.
FIG. 8D is a rear view of the wedge member shown in FIGS. 6 and 7.
FIG. 8E is a bottom view of the wedge member shown in FIGS. 6 and 7.
FIG. 8F is an enlarged view of the area A of FIG. 8E.

Referring to FIGS. 6-8, there is shown a side wall seal assembly 140 for angling the seal 100 downward by using a wedge member 150 with seal 100. Wedge 150 is an accessory to the side wall seal 100. It is useful in angling the seal downwards for better water resistance. Wedge 150 is also useful when the building side wall is not completely vertical, e.g. where the building has a thatched siding, thereby allowing the side wall seal 100 to extend from the building side wall at a substantially 90 degree angle. The wedge member 150 may be attached to the building side wall and the seal 100 attached to the wedge 150. Wedge 150 includes a front wall 152, a side wall 154, a rear wall 156, a top portion 158 and a bottom portion 160. There is a split seam 162 in bottom portion 160 such that the wedge 150 may be pulled apart to fit around the pipe exiting the building side wall and then closed and held in place by members 164 and 166. The side wall seal 100 is first aligned with wedge 140 by lugs 168 of the wedge which are inserted into openings 168A of the seal 100. The seal 100 is then attached to wedge 140 by fasteners (not shown) extending through apertures 114 of side wall seal 100 and apertures 114A of wedge 150 then into the building side wall. Additionally, split seam 162 may be held together by fasteners (not shown) extending through apertures 114A.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A side wall seal for piping extending from a side wall of a building which is water resistant comprising an annular ring adapted to be attached to the side wall of the building, a substantially annular vertical wall extending outwardly from said annular ring and having a substantially vertical seam in said annular vertical wall, the annular vertical wall adapted to engage the piping throughout the entire length of the annular vertical wall, a first ear extending outwardly from said annular vertical wall adjacent a first side of the seam and a second ear extending outwardly from the annular vertical wall adjacent a second side of the seam, the first and second ears not extending the entire length of the annular vertical wall and a closure mechanism for closing the seam around said piping, a wedge member adapted to attach to the building and the side wall seal is adapted to connect to the wedge member, wherein the wedge member is adapted to angle the side wall seal downward, wherein the wedge member has a front wall, a back wall, a side wall, a top portion and a bottom portion, and the front wall includes at least one lug member for attachment to a corresponding lug aperture on the annular ring of the side wall seal for aligning the wedge member and the side wall seal for attachment of the wedge member and the side wall seal to the building, and wherein the side wall seal provides a water resistant seal for the piping exiting the side wall of the building.

2. The side wall seal of claim 1 wherein the seal is adapted to seal piping extending out of the building at a ninety degree angle.

3. The side wall seal of claim 2 wherein the piping comprises a single pipe or multiple pipes.

4. The side wall seal of claim 1 wherein the seal is adapted to be used in retrofit installation or in new installation.

5. The side wall seal of claim 1 wherein the seal is one piece.

6. The side wall seal of claim 1 wherein the side wall seal is made of plastic and overmolded with a flexible rubber.

7. The side wall seal of claim 6 wherein the plastic is an acrylic-styrene-acrylonitrile copolymer and the flexible rubber is a thermoplastic elastomer.

8. The side wall seal of claim 1 wherein the closure mechanism comprise a tongue and groove closure or a snap closure.

9. The side wall seal of claim 1 wherein the wedge member includes a split seam adapted to allow the wedge member to fit over the piping.

10. A side wall seal for piping which is water resistant and adapted to seal piping extending out of a side wall of a building at a ninety degree angle comprising an annular ring adapted to be attached to the side wall of the building, a substantially annular vertical wall extending outwardly from said annular ring and having a substantially vertical seam in said annular vertical wall, the annular vertical wall adapted to engage the piping throughout the entire length of the annular vertical wall, a first ear extending outwardly from said annular vertical wall adjacent a first side of the seam and a second ear extending outwardly from the annular vertical wall adjacent a second side of the seam, the first and second ears not extending the entire length of the annular vertical wall and a closure mechanism for closing the seam around said piping, wherein the seal is one piece and made of plastic and overmolded with a flexible rubber, a wedge member adapted to attach to the building and the side wall seal is adapted to connect to the wedge member, wherein the wedge member is adapted to angle the side wall seal downward, wherein the wedge member has a front wall, a back wall, a side wall, a top portion and a bottom portion, and the front wall includes at least one lug member for attachment to a corresponding lug aperture on the annular ring of the side wall seal for aligning the wedge member and the side wall seal for attachment of the wedge member and the side wall seal to the building, and wherein the side wall seal provides a water resistant seal for the piping exiting the side wall of the building.

11. The side wall seal of claim 10 wherein the piping comprises a single pipe or multiple pipes.

12. The side wall seal of claim 11 wherein the seal is adapted to be used in retrofit installation or in new installation.

13. The side wall seal of claim 12 wherein the plastic is an acrylic-styrene-acrylonitrile copolymer and the flexible rubber is a thermoplastic elastomer.

14. The side wall seal of claim 13 wherein the closure mechanism comprise a tongue and groove closure or a snap closure.

15. The side wall seal of claim 10 wherein the wedge member includes a split seam adapted to allow the wedge member to fit over the piping.

\* \* \* \* \*